(12) United States Patent
Woicke

(10) Patent No.: US 8,995,638 B2
(45) Date of Patent: Mar. 31, 2015

(54) PROVISIONING AND CORRELATING A DYNAMIC PHONE NUMBER TO IDENTIFY A UNIQUE CALLER

(76) Inventor: Michael Duane Woicke, Olathe, KS (US)

( * ) Notice: Subject to any disclaimer, the term of this patent is extended or adjusted under 35 U.S.C. 154(b) by 273 days.

(21) Appl. No.: 13/410,445

(22) Filed: Mar. 2, 2012

(65) Prior Publication Data
US 2012/0300916 A1    Nov. 29, 2012

Related U.S. Application Data

(60) Provisional application No. 61/489,695, filed on May 25, 2011.

(51) Int. Cl.
    *H04M 3/42*      (2006.01)
    *H04M 3/523*      (2006.01)
    *H04M 7/00*      (2006.01)

(52) U.S. Cl.
    CPC ........ *H04M 3/5235* (2013.01); *H04M 3/42025* (2013.01); *H04M 3/42059* (2013.01); *H04M 7/0012* (2013.01); *H04M 7/003* (2013.01)
    USPC ............ 379/207.13; 379/201.01; 379/201.02; 379/207.14

(58) Field of Classification Search
    CPC .............. H04M 3/42; H04M 3/42008; H04M 3/42025; H04M 3/42059; H04M 3/42085; H04M 3/42102; H04M 3/4211; H04M 3/42144; H04M 3/42153; H04M 2207/12; H04M 2207/187; H04Q 3/0025; H04Q 3/0029
    USPC ............... 379/201.1, 201.02, 201.11, 201.12, 379/207.02, 207.15, 211.02
See application file for complete search history.

(56) References Cited

U.S. PATENT DOCUMENTS

| | | | | |
|---|---|---|---|---|
| 7,020,256 | B2 * | 3/2006 | Jain et al. | 379/201.02 |
| 2003/0147519 | A1 * | 8/2003 | Jain et al. | 379/211.02 |
| 2004/0162916 | A1 * | 8/2004 | Ryan | 709/245 |
| 2004/0190495 | A1 * | 9/2004 | White et al. | 370/352 |
| 2004/0210529 | A1 * | 10/2004 | Wu | 705/42 |
| 2005/0080685 | A1 * | 4/2005 | Blum | 705/26 |
| 2007/0208934 | A1 * | 9/2007 | Heffez | 713/161 |
| 2008/0304631 | A1 * | 12/2008 | Vilis et al. | 379/45 |
| 2010/0094983 | A1 * | 4/2010 | Zampiello et al. | 709/222 |
| 2010/0103926 | A1 * | 4/2010 | Haartsen | 370/352 |
| 2010/0246569 | A1 * | 9/2010 | Kawada et al. | 370/352 |
| 2011/0166935 | A1 * | 7/2011 | Armentrout et al. | 705/14.54 |
| 2011/0282730 | A1 * | 11/2011 | Tarmas | 705/14.42 |
| 2011/0307341 | A1 * | 12/2011 | Zohar et al. | 705/14.73 |
| 2012/0041809 | A1 * | 2/2012 | Park | 705/14.17 |
| 2012/0088476 | A1 * | 4/2012 | Greenfield | 455/414.1 |
| 2012/0246230 | A1 * | 9/2012 | Ferbar et al. | 709/204 |

* cited by examiner

*Primary Examiner* — Khai N Nguyen
(74) *Attorney, Agent, or Firm* — Raj Abhyanker, P.C.

(57) ABSTRACT

A method comprising directing a user equipped with a user's phone to a landing page in response to a call request to a call server communicatively coupled with a dynamic number insertion service ("DNIS") provisioning server is disclosed. The user may be presented with an offer visible on the landing page such that the offer may be associable with the user's IP address. A user record may be created such that the user may be identifiable through a plurality of unique identifiers. A dynamic DNIS may be provisioned using the DNIS provisioning server such that a called ID associable with the landing page may be generated and the dynamic DNIS may be dialed such that the called ID may be captured. The user record may be matched using the dynamic DNIS and the dynamic DNIS may be released for re-use.

20 Claims, 16 Drawing Sheets

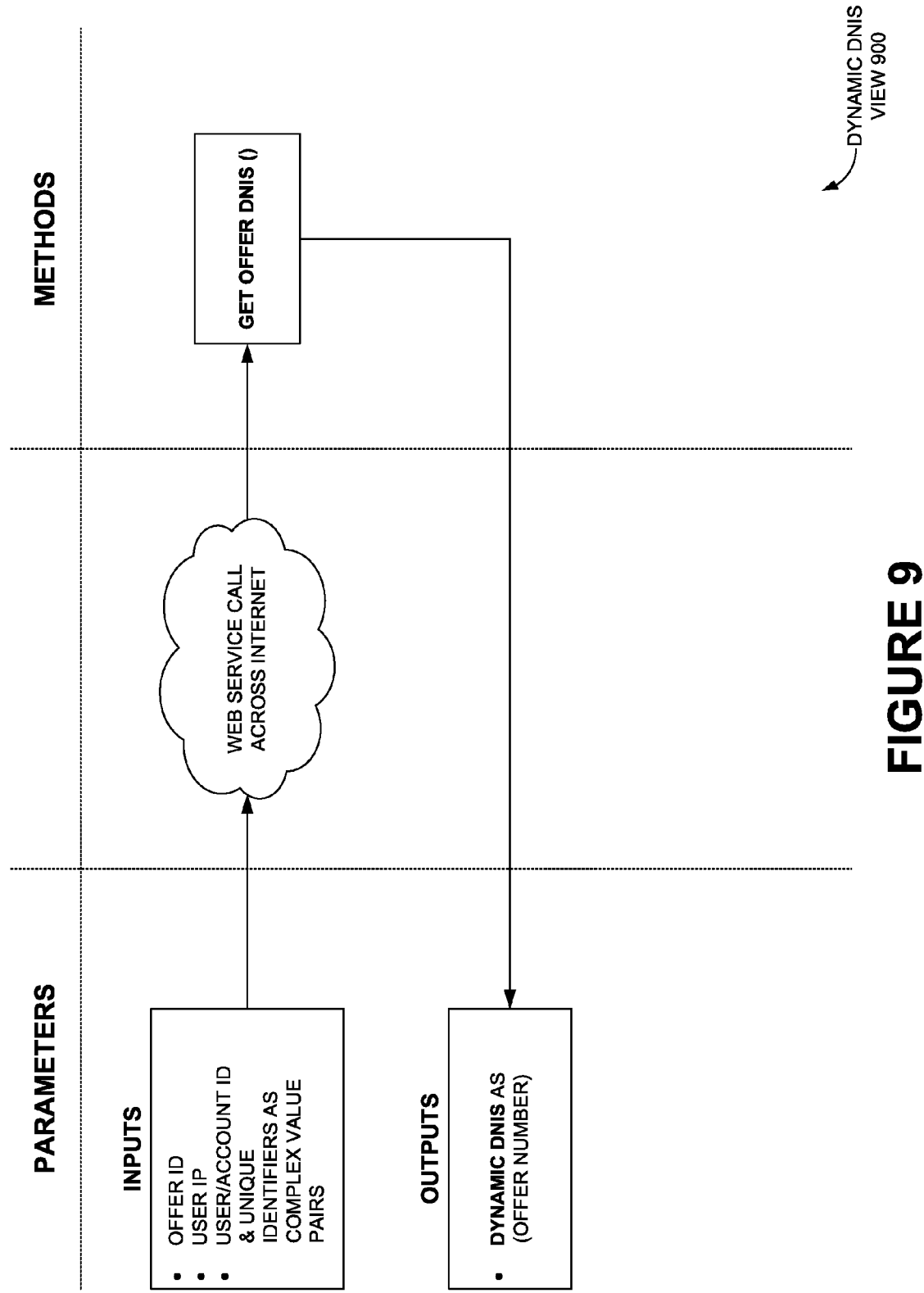

TABLE I (PRE-CALL USER RECORD)

| OFFER ID 1102 | UNIQUE ID 204 | ASSIGNED DNIS 1104 | USER'S IP ADDRESS 208 | OTHER UNIQUE IDENTIFIERS 1106 | CALLER ID 1114 | DNIS ASSIGNED DATE 1108 | DNIS EXPIRATION DATE 1110 | OFFER COMPLETED 1112 |
|---|---|---|---|---|---|---|---|---|
| 1000 | JSMITH3245 | (555) 342-8423 | 111.123.111 | - | NULL | 2010-12-11 21:34:00 | 2010-12-12 21:34:00 | NULL |
| 1000 | SRILLEY4353 | (554) 734-0924 | 112.123.112 | - | NULL | 2010-12-11 21:29:00 | 2010-12-12 21:29:00 | NULL |
| 1001 | TWRIGHT7657 | (553) 967-9932 | 113.123.113 | - | NULL | 2010-12-11 21:28:00 | 2010-12-12 21:28:00 | NULL |

FIGURE 11A

TABLE II (POST CALL USER RECORD)

| OFFER ID 1102 | UNIQUE ID 204 | ASSIGNED DNIS 1104 | USER'S IP ADDRESS 208 | OTHER UNIQUE IDENTIFIERS 1106 | CALLER ID 1114 | DNIS ASSIGNED DATE 1108 | DNIS EXPIRATION DATE 1110 | OFFER COMPLETED 1112 |
|---|---|---|---|---|---|---|---|---|
| 1000 | JSMITH3245 | (555) 342-8423 | 111.123.111 | - | (555) 432-2432 | 2010-12-11 21:34:00 | - | TRUE |
| 1000 | SRILLEY4353 | (554) 734-0924 | 112.123.112 | - | (554) 953-8423 | 2010-12-11 21:29:00 | - | FALSE |
| 1001 | TWRIGHT7657 | (553) 967-9932 | 113.123.113 | - | (553) 633-8534 | 2010-12-11 21:28:00 | - | TRUE |

TABLE VIEW 1100

FIGURE 11B

| OFFER 200 | OFFER AMOUNT 1302 | OFFER SELECTION RATE 1304 | OFFER SCORE 1306 | OFFER RANK 1308 |
|---|---|---|---|---|
| OFFER 1 | $0.10 | 0.05 | 0.0050 | 2 |
| OFFER 2 | $0.05 | 0.05 | 0.0025 | 3 |
| OFFER 3 | $0.50 | 0.12 | 0.0600 | 1 |
| OFFER 4 | NONE | NONE | NONE | - |
| OFFER 5 | NONE | NONE | NONE | - |
| ••• | ••• | ••• | ••• | ••• |

OFFER RANK VIEW 1300

PROVISIONING AND CORRELATING A DYNAMIC PHONE NUMBER TO IDENTIFY A UNIQUE CALLER

CLAIM OF PRIORITY

This utility patent application claims priority from and incorporates by reference in its entirety, U.S. Provisional Patent Application No. 61/489,695 titled "PROVISIONING AND CORRELATING A DYNAMIC PHONE NUMBER TO IDENTIFY A UNIQUE CALLER" and filed on May 25, 2011.

BACKGROUND

Today, web forms are used to pass unlimited data from page to page without losing state and logged in web users are easily identifiable when completing forms or other tasks. Passing data or unique identifiers that are tied to a caller via a dialed telephone number is currently not possible due to telephone limitations. When a call center receives a call from an inbound caller, there is no way to relate that unique phone number to the user's identification on the web or in Multi-User Domains ("MUDs") or massively multi player online role-playing games (MMORPGs). The "Click-To-Call" ("CTC") model does not work for implementing quick and efficient virtual currency transactions because there is no method or system to correlate the phone number of the person who is calling to that person's web identity. There may exist two types of CTCs. One may require a user to supply his/her phone number (to get a call back) and the other one may require the user to call a number for initial background.

Adding a CTC capability to a website on the Internet may enable users of the website to call a service provider directly from the website. However, passing data or unique identifiers that are tied to the caller/user who uses CTC is not possible because there is no way to tie a user's account ID or unique ID (the user name the user uses on the website) to that particular user, especially when virtual currency is involved (applies to CTC systems that a user does not supply his/her phone number to). In essence, the business or service which is being called by the CTC user does not know who the exactly the CTC user is.

CTC technology now virtually always refers to a means for a web consumer to ask a website operator to call him/her. In other words, "click-to-call" would be more accurately referred to as "request-a-call," as in "please give me a call (here is my phone number)." Obviously, therefore, CTC technology in most instances requires the web consumer to enter his/her phone number in order for the site operator or audio telephony version of an auto-responder, to place the call. This presents a privacy problem as the user may not want an advertiser to have his/her personal mobile phone number or any other personal phone number.

The problem lies in the fact that although the site operator or auto-responder may know the real identity of the person who requested the call (as in a traditional CTC). If any actionable information is known, it may be only that person's web identification or that person's user name or other identification used by that person on the Internet or mobile web site from which the click to call or request to call operation was performed. This presents a problem for quickly, securely and efficiently transferring virtual currency to that particular user because the end user may have to supply the callback number and even though the user's phone number may be captured on an inbound call (which may not be known to the average user), there is also a privacy factor involved with the user's giving up their mobile number to an advertiser.

SUMMARY

In one exemplary aspect, a method comprising directing a user equipped with a user's phone to a landing page in response to a call request to a call server communicatively coupled with a DNIS ("Dynamic Number Insertion Service") provisioning server is disclosed. The user may be presented with an offer visible on the landing page such that the offer may be associable with a user's IP ("Internet Protocol") address. A user record may be created such that the user may be identifiable through a plurality of unique identifiers.

According to another aspect, a dynamic DNIS may be provisioned using the DNIS provisioning server such that a called ID (e.g., the number called) associable with the landing page may be generated. The dynamic DNIS may be dialed such that the called ID may be captured. The user record may be matched using the dynamic DNIS and dynamic DNIS may be released for re-use.

The unique identifier may be an IP address, an offer ID, a user ID and an account ID. The called ID and a unique ID may also be associable with the user within the DNIS provisioning server such that a virtual currency associable with the user may be transmitted to the user's phone. The unique ID may be correlated to a call's duration such that a $3^{rd}$ party API ("Application Programming Interface") associable with the user may be correlated to the unique ID and/or the called ID. The called ID and the unique ID associable with the user may be correlated within the DNIS provisioning server. Further, a unique ID associable with the call server may be transmitted to a Computer Telephony Integration ("CTI") server such that a call center screen pop may be created from a call center reference ID in a CTI interface. The unique ID may be tied to a primary key in a database such that data may be pulled back based on the unique identifier.

Other aspects may comprise provisioning the dynamic DNIS to a user equipped with a user's phone and determining a geo-location of the user based on the user's IP address. A plurality of phone numbers may be queried for the dynamic DNIS and the dynamic DNIS may be assigned to a user record if a phone number is available and/or not expired. The dynamic DNIS may be provisioned within proximity of the geo-location of the user and the dynamic DNIS may be assigned to the user record if the phone number is not available and/or expired.

An interesting aspect is that an offer presented to the user may be associable with the user's IP address such that a called ID associable with the user's phone may be correlated to the user within the DNIS provisioning server. It will be appreciated that an area code of the user may be determined using the user's IP address. The unique ID may be tied to a primary key in a database such that data may be pulled back based on the unique identifier.

In yet another aspect, a user module may direct the user equipped with a user's phone to a landing page in response to a call request to a call server communicatively coupled with a DNIS provisioning server. An offer module may present the user with an offer visible on the landing page such that the offer may be associable with a user's IP address. A unique identifier module may create a user record such that the user may be identifiable through a plurality of unique identifiers. Further, a DNIS module may provision a dynamic DNIS using the DNIS provisioning server such that a called ID associable with the landing page may be generated. It will also be appreciated that a currency module may be implemented wherein a called ID and a unique ID may be associable with the user within the DNIS provisioning server such that a virtual currency associable with the user may be transmitted to the user's phone.

The unique identifier may be an IP address, an offer ID, a user ID and/or an account ID. The called ID and a unique ID may be associable with the user within the DNIS provisioning server such that the virtual currency associable with the user may be transmitted to the user's phone. The unique ID may be correlated to a call's duration such that a $3^{rd}$ party API associable with the user may be correlated to the unique ID and/or the called ID. The called ID and the unique ID associable with the user may also be correlated within the DNIS provisioning server. In addition, a unique ID associable with the call server may be transmitted to a CTI server such that a call center screen pop may be created from a call center reference ID in a CTI interface. The unique ID may be tied to a primary key in a database such that data may be pulled back based on the unique identifier.

The methods and systems disclosed herein may be implemented by any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 9 is a Dynamic DNIS View 900, according to one or more embodiments.

FIGS. 11A and 11B illustrate a Table View 1100, according to one or more exemplary embodiments.

FIG. 13 illustrates an Offer Rank View 1300, according to one or more exemplary embodiments.

Figure 1:
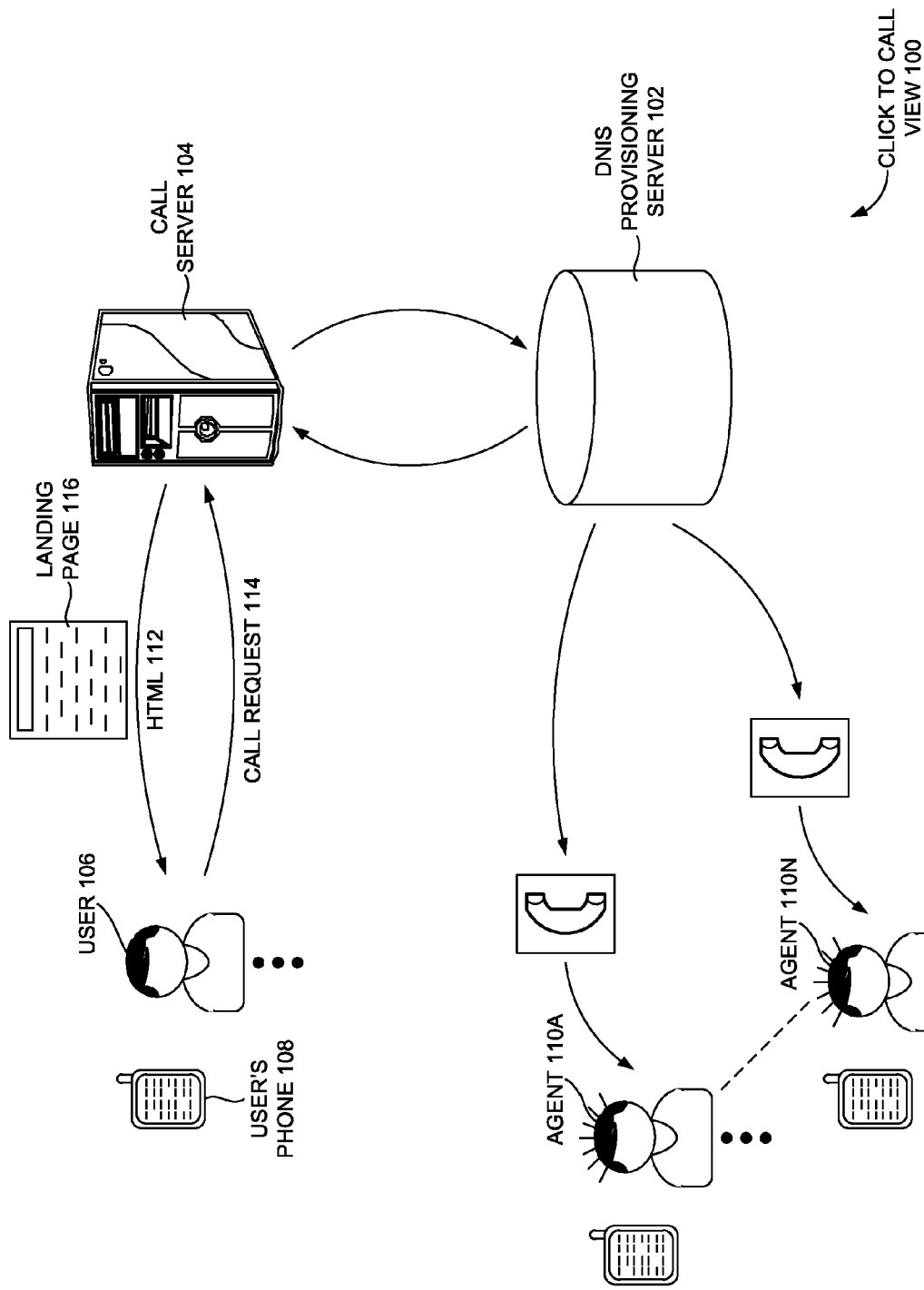
FIG. 1 illustrates a Click to Call View 100 according to one or more embodiments.

Other features of the present embodiments will be apparent from the accompanying drawings and from the detailed description that follows.

DETAILED DISCLOSURE

Disclosed are a method, an apparatus and/or a system of provisioning and correlating a dynamic phone number to identify a unique caller, according to one or more embodiments. Although the present embodiments have been described with reference to specific example embodiments, it will be evident that various modifications and changes may be made to these embodiments without departing from the broader spirit and scope of the various embodiments.

According to one embodiment, virtual currency 302 or in-game currency depending on environment may be used to purchase virtual goods within a variety of online communities; which may include social networking websites, virtual worlds and online gaming sites. A key revenue driver within social media, virtual currencies may be specific within each game and may be used to purchase in-game goods. Characters or avatars in virtual worlds may own things within the context of the virtual world and users may collect each game's virtual currency 302 to purchase land, supplies and various items used to enhance their status and add points. Some virtual currencies may be time-based, relying upon measurement of in-game achievements in order to accrue exchangeable points, according to one or more embodiments.

A virtual economy or sometimes synthetic economy may be an emergent economy existing in a virtual persistent world, and may exchanging virtual goods in the context of an Internet game, according to one embodiment. Users may enter these virtual economies for recreation and entertainment rather than necessity, which may mean that virtual economies may lack the aspects of a real economy that may not considered to be "fun" (for instance, players in a virtual economy often may not need to buy food in order to survive, and usually may not have any biological needs at all). However, some people may interact with virtual economies for real economic benefit, according to one or more exemplary embodiments.

Virtual economies may be observed in MUDs and massively multi player online role-playing games (MMORPGs), according to one or more embodiments. The largest virtual economies may be found in MMORPGs. Virtual economies may also exist in life simulation games which may have taken the most radical steps toward linking a virtual economy with the real world. This may be seen, for example, in Second Life's recognition of intellectual property rights for assets created "in-world" by subscribers, and its laissez-faire policy on the buying and selling of Linden Dollars (the world's official currency) for real money on third party websites. Virtual economies may also exist in browser-based Internet games where "real" money may be spent and user-created shops opened, or as a kind of emergent gameplay. Virtual property may be a label that may refer to any resource that is controlled by the powers-that-be, including virtual objects, avatars, or user accounts, according to one or more embodiments.

Rivalry may be the possession of a resource is limited to one person or a small number of persons within the virtual world's game mechanics, according to one embodiment. Persistence is when the virtual resources may persist across user sessions. In some cases, the resource may exist for public view even when its owner may not logged into the virtual world. Interconnectivity is when resources may affect or be affected by other people and other objects. The value of a resource may vary according to a person's ability to use it for creating or experiencing some effect. Secondary markets are where virtual resources may be created, traded, bought, and sold. Real-world assets (typically money) may be at stake. Finally, value added by users may enhance the value of virtual resources by customizing and improving upon the resource, according to one or more exemplary embodiments.

The existence of these conditions may create an economic system with properties similar to those seen in contemporary economies. Therefore, economic theory may often be used to study these virtual worlds, according to one or more embodiments. Within the virtual worlds they inhabit, synthetic economies may allow in-game items to be priced according to supply and demand rather than by the developer's estimate of the item's utility. These emergent economies may be considered by most players to be an asset of the game, giving an extra dimension of reality to play. In classical synthetic economies, these goods may be charged only for in-game currencies. These currencies may often be sold for real world profit, according to one embodiment.

According to one embodiment, a unique identification (for example, Unique ID 204 of FIG. 2) or multiple unique identifications may be correlated to a User 106 by means of dialing a phone number through a web interface or through a mobile interface (for example, the User's Phone 108). The embodiment may include a method where either a web or mobile identifiable user may opt-in to a CTC or published telephone number offer (for example, Offer 200). It may be that, according to one embodiment, that upon clicking or opting into the offer, the user may be navigated to a landing page (for example, Landing Page 116) where the system may database the user's internet protocol (IP) address (for example, User's IP Address 208), the identification of the offer, the user's own identification (for example, Unique ID 204), account identification or any other identification associated with the website or user (see FIG. 2). The landing page may then provision and display a unique dynamic phone number (for example, Called ID 202) for that particular user to dial into which may also be tied to the same unique identifications in the database (see FIG. 2).

In one exemplary embodiment, a method comprising directing a user 106 equipped with a user's phone 108 to a landing page 116 in response to a call request 114 to a call server 104 communicatively coupled with a DNIS provisioning server 102 is disclosed. The user 106 may be presented with an offer 200 visible on the landing page 116 such that the offer may be associable with a user's IP address 208. A user record may be created such that the user 106 may be identifiable through a plurality of unique identifiers 204 (see FIG. 2).

FIG. 1 describes a Click-To-Call View 100, according to one or more embodiments. A User 106 may use a User's Phone 108 to dial into an offer 200 after receiving the offer via HTML 112. The Call Request 114 may be sent to a Call Server 104. It may be that, according to one embodiment, the Agent 110 may not call back if a dynamic DNIS is provisioned. The Call Server 104 may place an outgoing call to the user without supplying a phone number. The dynamic phone number may be known as the CalledID 202 supplied by the DNIS provisioning server 102, according to one or more exemplary embodiments.

According to another embodiment, a dynamic DNIS may be provisioned using the DNIS provisioning server 102 such that a called ID 202 (e.g., the number called) associable with the landing page 116 may be generated. The dynamic DNIS may be dialed such that the called ID 202 may be captured. The user record may be matched using the dynamic DNIS and dynamic DNIS may be released for re-use (see FIG. 7).

Figure 2:
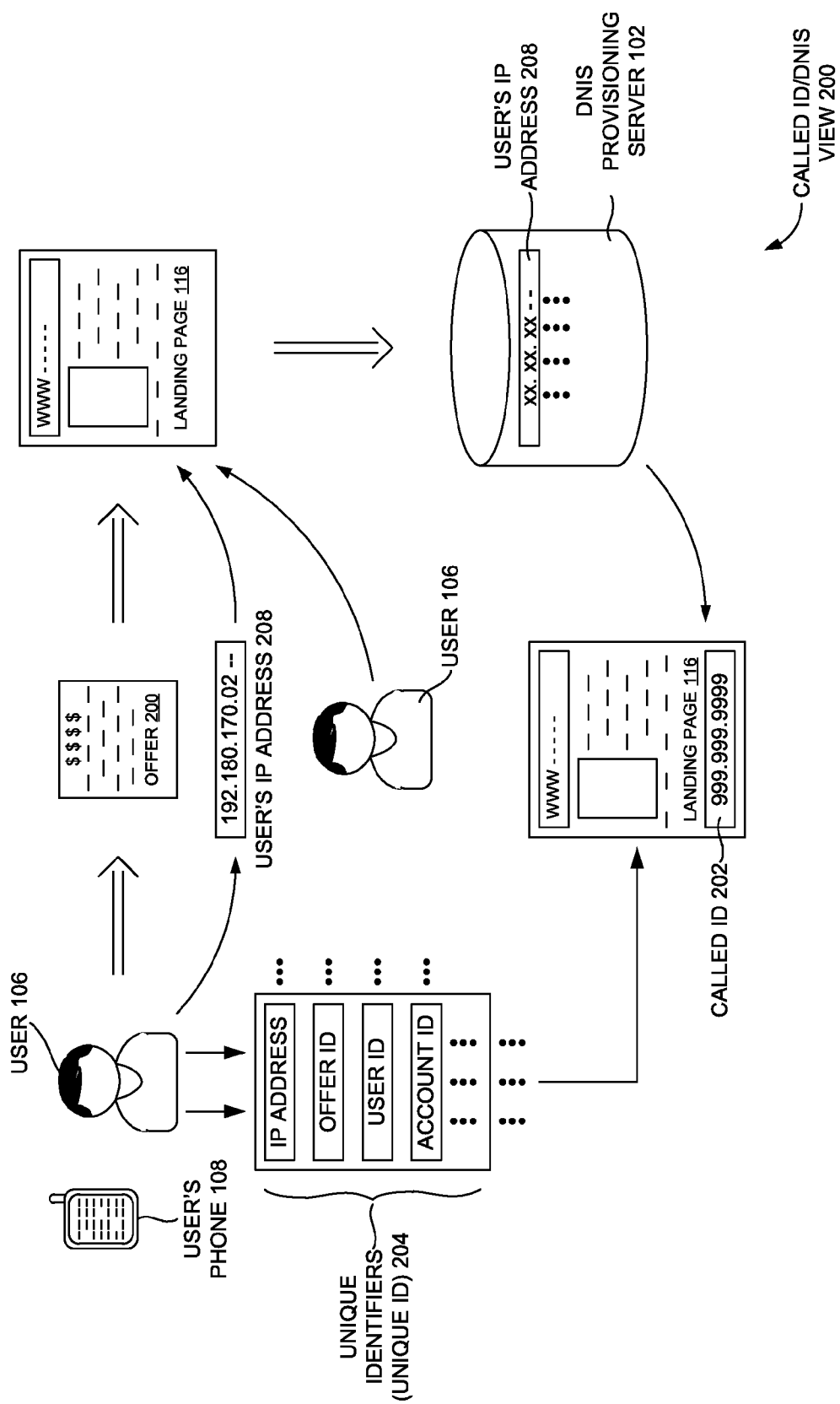
FIG. 2 illustrates a Called ID/Dynamic Number Insertion Service View 200 according to one or more embodiments.

FIG. 2 illustrates a Called ID/DNIS View 200. In one embodiment, the User 106 may have an IP Address, an Offer ID, a User ID, an Account ID, or any other form of personal identification to identify User 106 on a website or on the Internet. The user may see Offer 200 and may be shown to a Landing Page 116 upon which the DNIS Provisioning Server 102 may catalogue and database the User 106's IP Address 208 and other said identifiers. In addition, the User 106's Landing Page 116 may be provisioned with a dynamic phone number in the form of a Called ID 202 and may assign and display this unique dynamic phone number (for example, Called ID 202) for User 106 to dial into which may also be tied the same Unique ID 204 in the DNIS Provisioning Server 102, according to one or more exemplary embodiments.

According to another embodiment, the unique identifier 204 may be an IP address, an offer ID, a user ID and an account ID. The called ID 202 and a unique ID 204 may also be associable with the user 106 within the DNIS provisioning server 102 such that a virtual currency 302 associable with the user 106 may be transmitted to the user's phone 108. The unique ID 204 may be correlated to a call's duration 404 such that a $3^{rd}$ party API 402 ("Application Programming Interface") associable with the user 106 may be correlated to the unique ID 204 and/or the called ID 202, according to another embodiment. The called ID 202 and the unique ID 204 associable with the user 106 may be correlated within the DNIS provisioning server 102. Further, a unique ID 204 associable with the call server 104 may be transmitted to a Computer Telephony Integration ("CTI") server 500 such that a call center screen pop 506 may be created from a call center reference ID 504 in a CTI interface 502, according to one or more exemplary embodiments. The unique ID 204 may be tied to a primary key in a database such that data may be pulled back based on the unique identifier 204.

Figure 3:
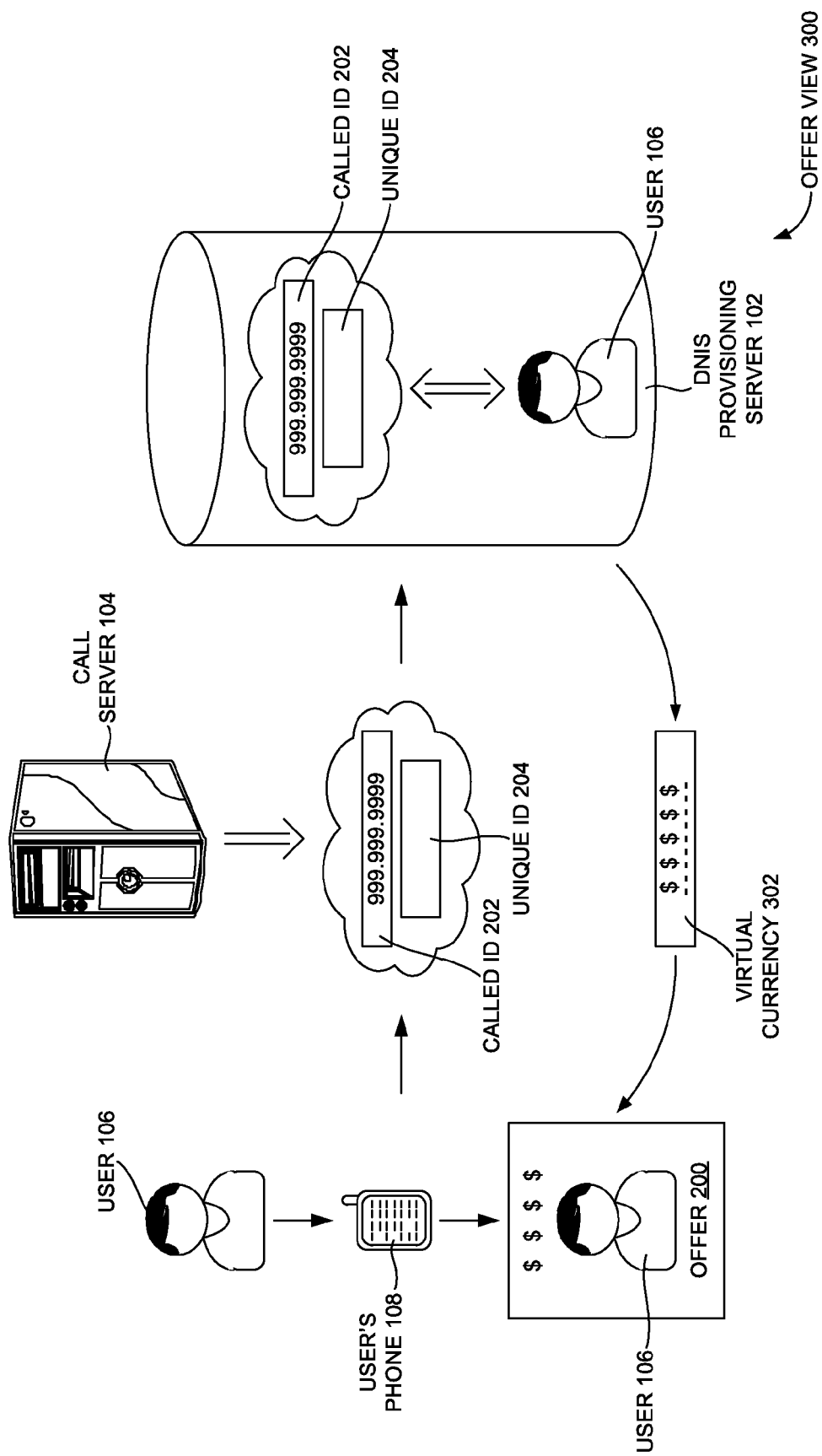
FIG. 3 shows an Offer View 300, according to one or more embodiments.
Figure 4:
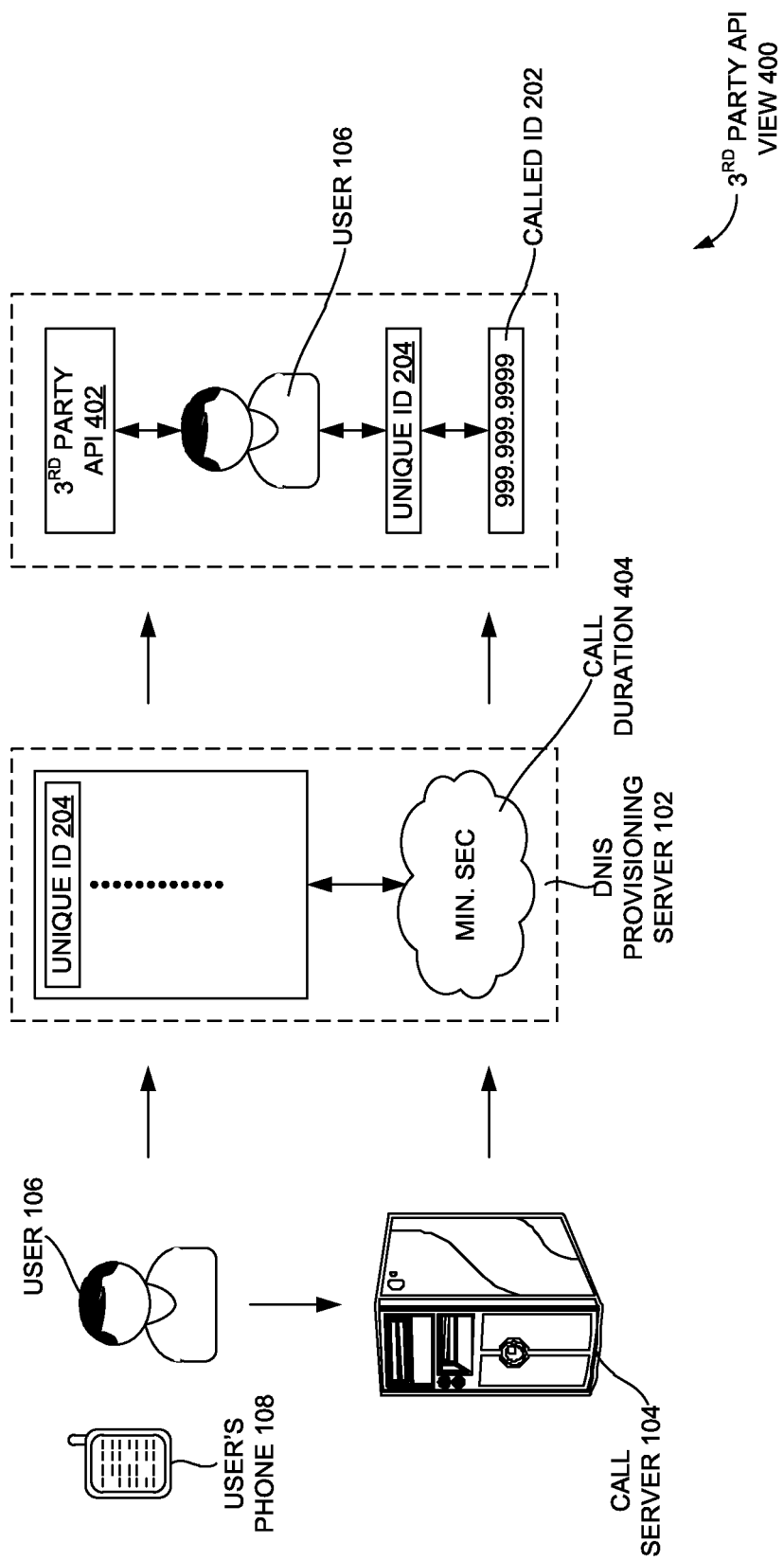
FIG. 4 is a schematic representation of a $3^{rd}$ Party API View 400, according to one or more embodiments.

FIG. 3 illustrates an Offer View 300 and FIG. 4 illustrates the correlation between the Call Duration 404 and Unique ID 204 in a $3^{rd}$ Party API View 400, according to one or more embodiments. For example, a User 106 may use the User's Phone 108 to opt into an Offer 200. The Call Server 104 may relate the Called ID 202 to the Unique ID 204 (from User 106) inside the DNIS Serer 102 to safely and securely transfer Virtual Currency 302 to User 106 without User 106 having to supply or divulge the phone number of User's Phone 108, according to one or more exemplary embodiments.

According to another embodiment, a "Mobile Carrier Type" may be based on the mobile IP lookup (for example, a user's carrier info may be tied to a mobile IP and may be used as an addition parameter for matching callers). It may be that local numbers may have a higher opt-in rate. According to an example embodiment, when the DNIS provision occurs, it may attempt to use a local number based on the geo-location of the user's mobile IP that may already be captured. In some instances, and according to one exemplary embodiment, the Call Server 104 may have to handle the CTC during the entire duration of the call and then invoke the $3^{rd}$ party API 402 when the call reaches the given thresholds or even a disconnect event. In other instances, and according to another embodiment, the Call Center may perform a SIP refer to the agent call center and it may delegate the call agent call center to invoke the API (for example, $3^{rd}$ party API 402) at the designated threshold. The advantage of the latter solution may be that the Call Server 104 may not have to incur call costs for the entire call duration. Though more cost effective, this may also be a more complicated solution as the Agent Call Center may have to take on the task of programming of the API call handler, according to one or more embodiments.

According to one embodiment, dynamic phone number (such as Called ID 202) may be inserted on websites or mobile Internet sites that may enable online marketers to display unique phone numbers on a website based on the referring keyword, pay-per-click ad, search engine, or online banner ad to track which traffic sources generate phone calls and sales leads. According to another exemplary embodiment, a method for tracking separate advertising or sales campaigns on a website or mobile interface may be to provision a dynamic telephone number (such as Called ID 202) to each one. When a unique telephone number is associated with an online ad campaign (such as Offer 200), it may ensure that when User 106 clicks Offer 200, the unique number may be displayed to the user (for example, User 106) on the website. If the user then opts to call that number rather than complete the web form, that user may still be tracked as a conversion within that campaign, according to one or more exemplary embodiments.

Figure 6A:
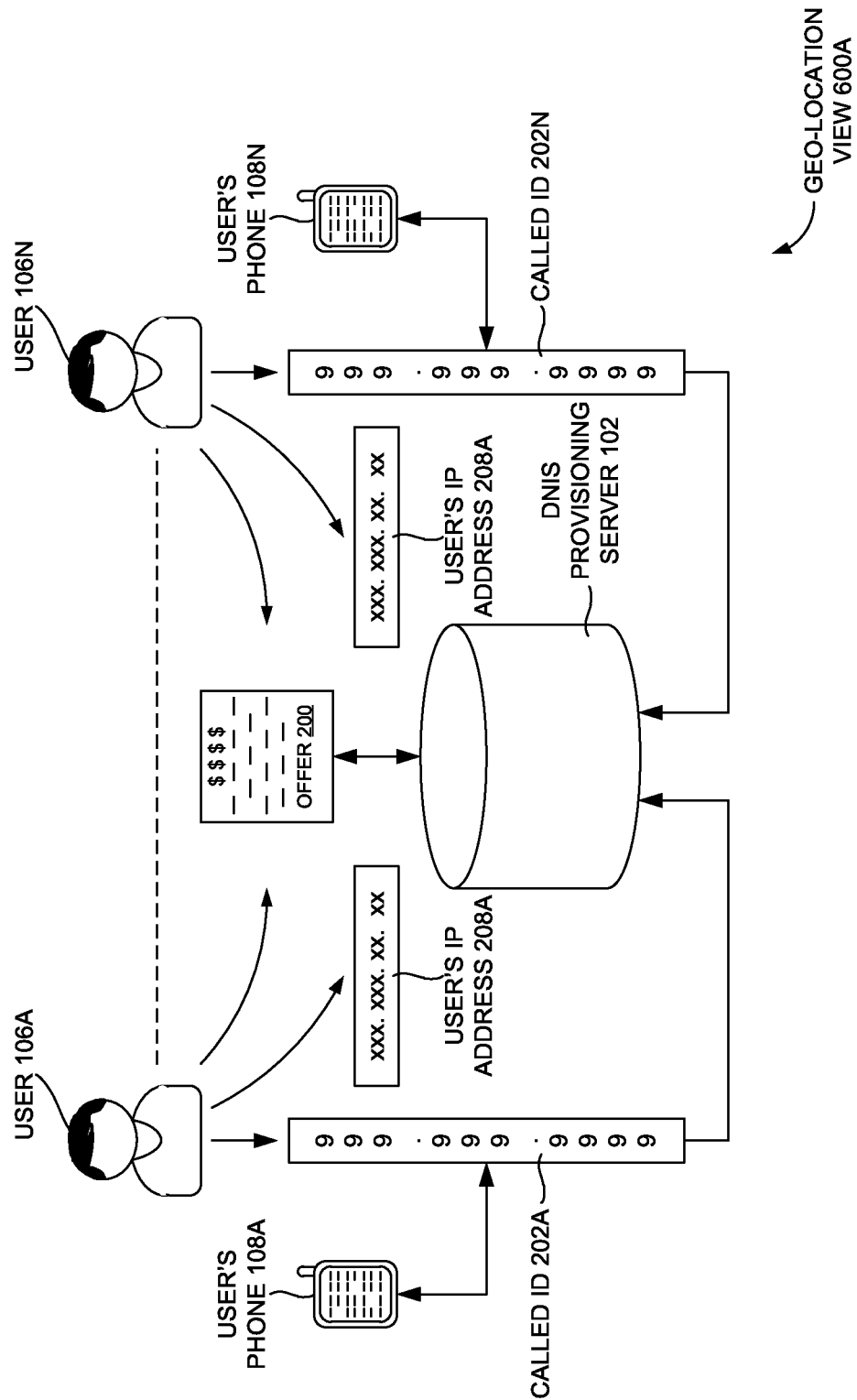
FIGS. 6A and 6B schematically illustrate a Geo-Location View 600A and 600B respectively, according to one or more embodiments.
Figure 6B:
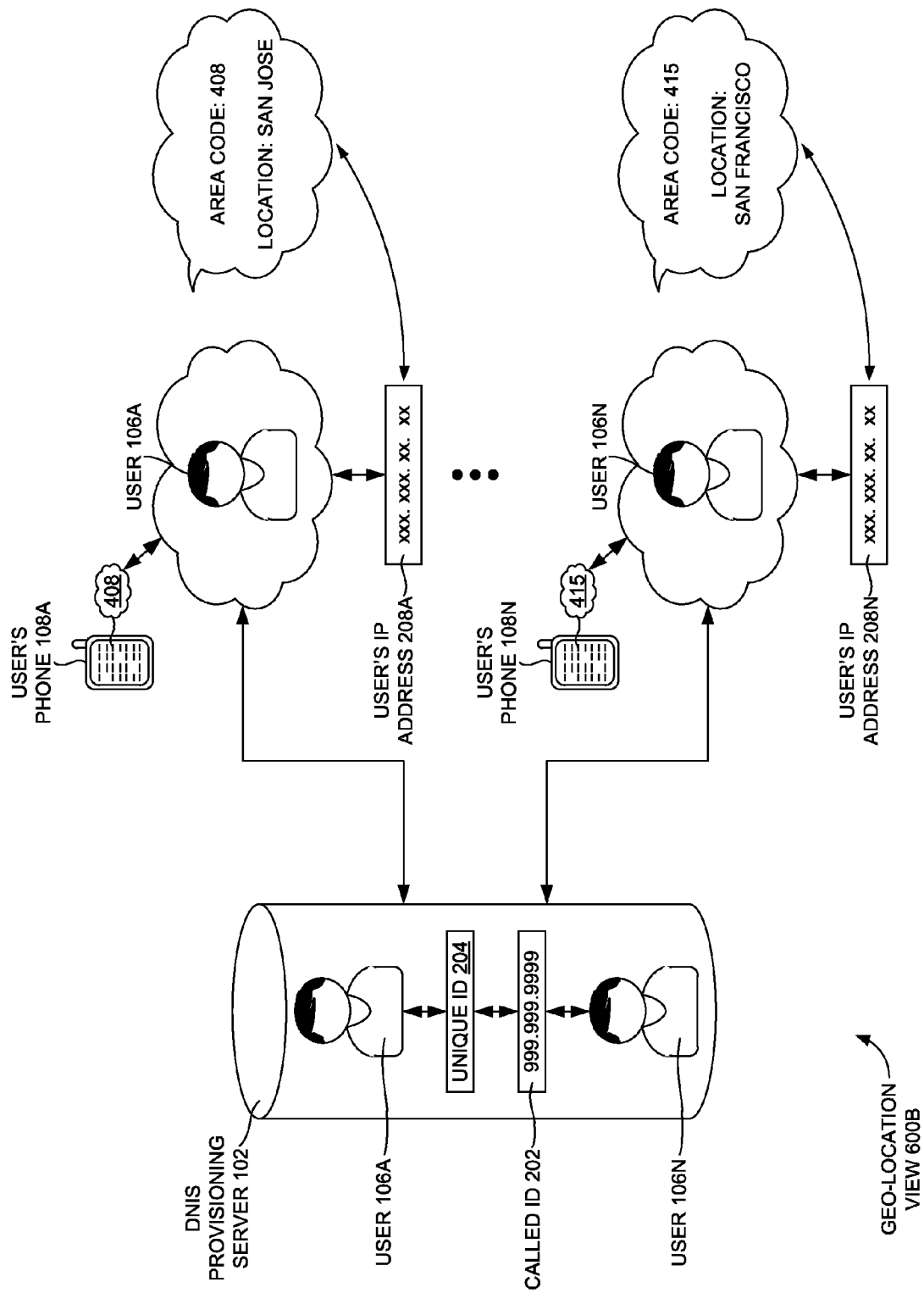

Other embodiments may comprise provisioning the dynamic DNIS to a user 106 equipped with a user's phone 108 and determining a geo-location of the user based on the user's IP address 208 (see FIGS. 6A and 6B). A plurality of phone numbers may be queried for the dynamic DNIS and the dynamic DNIS may be assigned to a user record if a phone number is available and/or not expired, according to one embodiment. The dynamic DNIS may be provisioned within proximity of the geo-location of the user and the dynamic DNIS may be assigned to the user record if the phone number is not available and/or expired, according to another embodiment.

According to one exemplary embodiment, when User 106's call connects, the DNIS Provisioning Server 102 may update the database record by associating the current caller (User 106) by matching the dynamic number dialed (i.e., a Called ID 202 via a DNIS, for example) with the assigned dynamic record and may add the user's Called ID 202. According to this embodiment, the User 106's unique identification or multiple unique identifications located in DNIS Provisioning Server 102 may now be associated to the same caller or user (i.e., User 106).

Figure 5B:
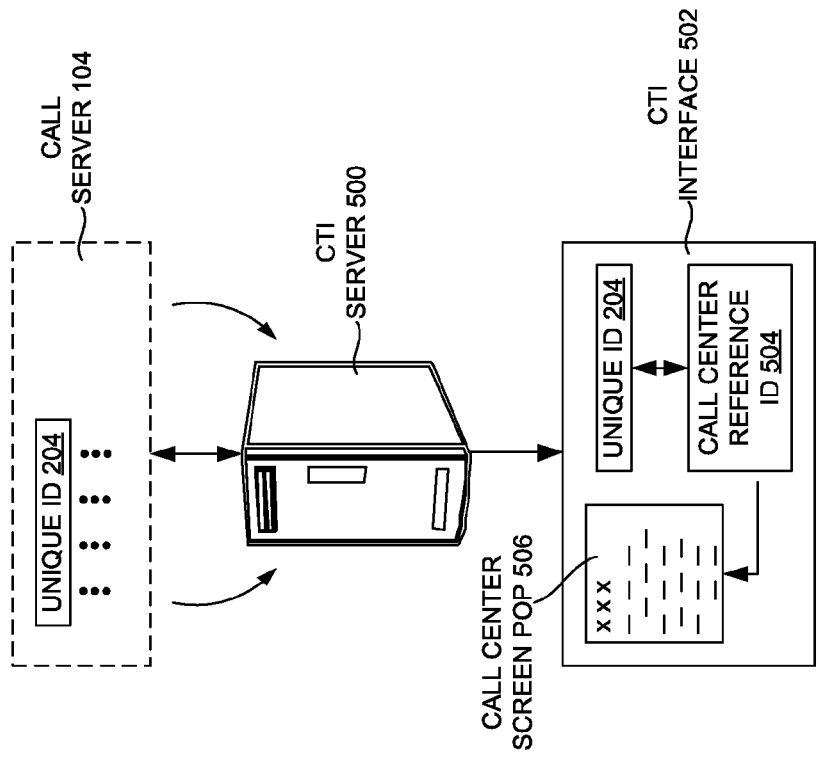
FIGS. 5A and 5B are schematic representations of a $3^{rd}$ Party API and a CTI Interface, according to one or more exemplary embodiments.
Figure 5A:
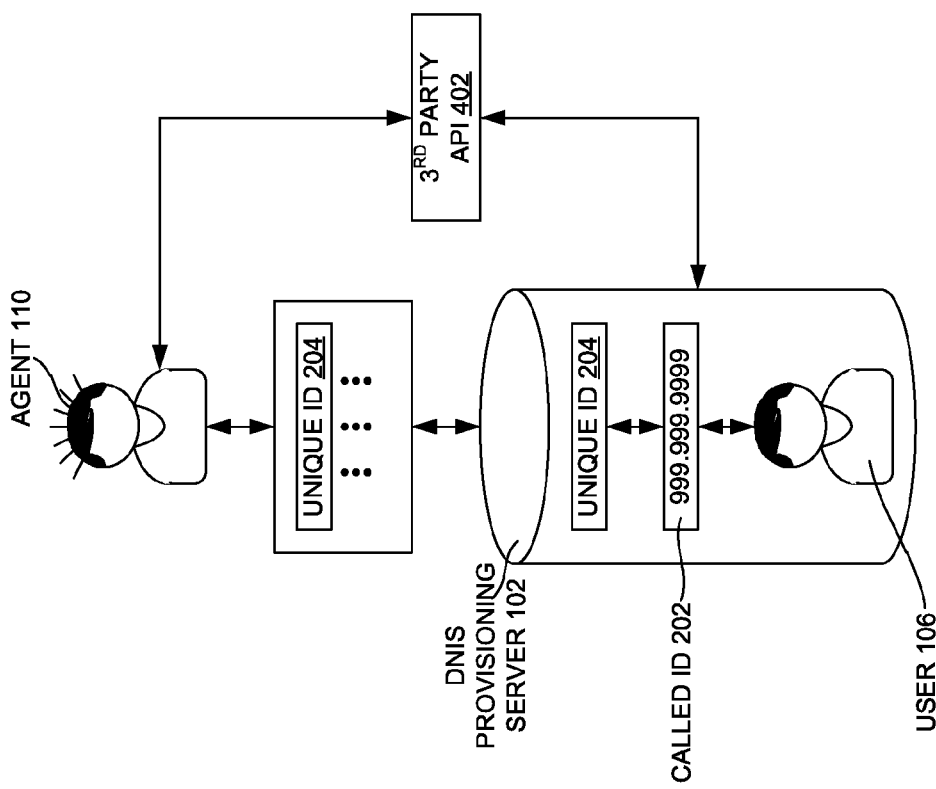

It will be appreciated that, according to one embodiment, the User 106's unique identification (for example, Unique ID 204) or multiple unique identifications established from the record (by the user calling the CTC number) may then be retrieved and passed to a third party application programming interface (API) (see FIGS. 5A and 5B) when the call may have achieved a specified threshold or pre-determined call duration (such as the calculation of Call Duration 404 inside DNIS Provisioning Server 102 as illustrated in FIG. 4). According to another embodiment, the unique identification or multiple unique identifications may also be queried by the called party (e.g., Agent 110) and may identify the caller/user by passing back the dynamically assigned phone number (i.e., Called ID 202 via a DNIS) to the system's API. According to another exemplary embodiment, the unique identification or multiple unique identifications may be presented to a CTI application as a Call Center Reference ID 504 and may be used as needed by the CTI application or CTI Interface 502 (e.g., a Call Center Screen Pop 506). The above mentioned embodiments in Paragraph [0017] may be implemented using a CTI Server 500 as illustrated in FIG. 5B, according to one or more exemplary embodiments.

According to one or more exemplary embodiments, an offer 200 presented to the user 106 may be associable with the user's IP address 208 such that a called ID 202 associable with the user's phone 108 may be correlated to the user 106 within the DNIS provisioning server 102. It will be appreciated that an area code of the user (see FIG. 6B) may be determined using the user's IP address 208. The unique ID 204 may be tied to a primary key in a database such that data may be pulled back based on the unique identifier 204 (see FIG. 2), according to one or more embodiments.

In yet another embodiment, a user module may direct the user 106 equipped with a user's phone 108 to a landing page 116 in response to a call request 114 to a call server 104 communicatively coupled with a DNIS provisioning server 102. An offer module may present the user 106 with an offer 200 visible on the landing page 116 such that the offer 200 may be associable with a user's IP address 208. A unique identifier module may create a user record such that the user may be identifiable through a plurality of unique identifiers 204. Further, a DNIS module may provision a dynamic DNIS using the DNIS provisioning server 102 such that a called ID 202 associable with the landing page 116 may be generated. It will also be appreciated that a currency module may be implemented wherein a called ID 202 and a unique ID 204 may be associable with the user 106 within the DNIS provisioning server 102 such that a virtual currency 302 associable with the user 106 may be transmitted to the user's phone 108, according to one or more exemplary embodiments.

According to another embodiment, the DNIS Provisioning Server 102 may implement a loop closure and may release the temporary phone number (e.g., dynamic phone number or Called ID 202) in the database and recycle it for future use in another call scenario, according to another embodiment. It may be that the call may not occur and the loop may not close, subsequently causing the database record to remain idle for an established period of time and then the temporary phone number may be released in the database for re-use, according to one embodiment. In another embodiment, the end user of the present system may not have to supply the callback number (for privacy reasons) because although the user's phone number may be captured on an inbound call (which may not be known to the average user), there may be a privacy factor involved with the user giving up his/her phone number to an advertiser.

According to one exemplary embodiment, the DNIS Provisioning Server 102 may allow advertisers to track the specific search engine, web page or keyword that generated an inbound phone call using tracking numbers. For example, advertisers may use the DNIS Provisioning Server 102 and the Called ID 202 to measure the performance of their online advertising campaigns and the impact on call volume. At the most basic level, DNIS may seamlessly replace select contact phone numbers on a web page with call tracking numbers, which may allow advertisers to measure volume. Combined with pay per click programs, DNIS may help complete the online advertising performance picture by clearly outlining the results of advertising campaigns both online and by phone. Advertisers using DNIS to measure and report phone calls driven by web activity may use two different methods: a server-side method called reverse proxy, and a client-side method that uses Javascript tracking codes, according to one exemplary embodiment.

According to an exemplary embodiment, the reverse proxy method may be implemented and instead of web requests going directly to an advertiser's website, the user request may be routed to an intermediary server which determines what content should be displayed. This proxy may retrieve the content from the advertiser's website and may transform the output by inserting and/or replacing specific phone numbers on the page with call tracking numbers based on keyword or search engine triggers. According to one embodiment, the dynamic number may also double as a proxy to an existing static number. This may be done via cached copies of an advertiser's website or in some cases, in real-time, for every request through the proxy so that any dynamic content included on the advertiser's page may be reflected ensuring that data may always stay current and up-to-date. As reverse proxy capability may be more readily available from SEM or other third party resellers, this approach may be very effective for local advertisers or SMBs that may not have sophisticated internal technology resources easily available to make modifications to their existing websites. Also, reverse proxy may be a better option for advertisers that use third party website functionality for shopping carts or email forms.

According to another embodiment, and as illustrated in FIG. 6A, if a previously issued dynamic phone number (i.e., the Called ID 202) expires and is reissued to a new user (for example, User 106N of FIG. 6A), there may be a chance that the previous user (for example, User 106A of FIG. 6A) may attempt to call that number even after it has been reassigned to another user and just before the new user has dialed the number. In this scenario, and as illustrated in FIG. 6B and according to one exemplary embodiment, the DNIS Provisioning Server 102 may implement a proprietary algorithm which may take the User 106's Called ID 202 and may determine a geo-location based on the user's area code as well as the geo-locations of all the IP addresses that may be tied to any expired or unclaimed phone number that may be assigned to the dynamic phone number dialed (e.g., DNIS) (see FIG. 6B).

According to one embodiment, the DNIS Provisioning Server 102 may perform a distance calculation on each record to determine the most likely caller/user by selecting the closest calculated proximity of the two points for each record. For example, a user (e.g., User 106A) may decide to write the offer phone number down and may call it at a later time of his/her choosing, according to one embodiment. It may be that the allotted time determined by the system may pass and may cause that offer phone number to expire. FIG. 6B illustrates an exemplary embodiment wherein the distance calculation based on a user's area code reveals the geo-location of both users (for example, San Jose (408) and San Francisco (415)).

It may be that according to one embodiment, a user (e.g., User 106N) may also be presented with the same offer as User 106A and User 106N's IP address and other determined unique identifiers may be collected and databased. User 106N may also be assigned a dynamic phone number that may be tied to the newly created record about User 106N. According to one embodiment, before User 106N may have a chance to dial to the dynamic phone number (e.g., the offer phone number), User 106A may call the same dynamic phone number. Since the system may only know two pieces of information about the caller (for example, the offer phone number dialed and the user's Caller ID 1114 of FIGS. 11A and 11B), it may be unable to determine which of the two users (User 106A or 106N) may have actually dialed in. In addition, the phone number provisioned to the end user may be determined by the user's mobile IP address, according to one embodiment.

According to one embodiment, the system may know that there may be two unclaimed records which may be tied to the same offer number dialed where one record's IP address may be located in a particular geographical location with its own area code and the other record's IP address may be located in another geographical location also with its own area code. According to this embodiment, the system may perform an area code lookup from User #1 and may also do a proximity calculation between User 106A's location and User 106N's location (gleaned through their respective IP address recorded in the database). In this way, the system may determine with fair certainty that User 106A may belong to the unclaimed record which has an IP address located in User 106A's geographical location, according to one exemplary embodiment (see FIG. 6B).

Figure 7:
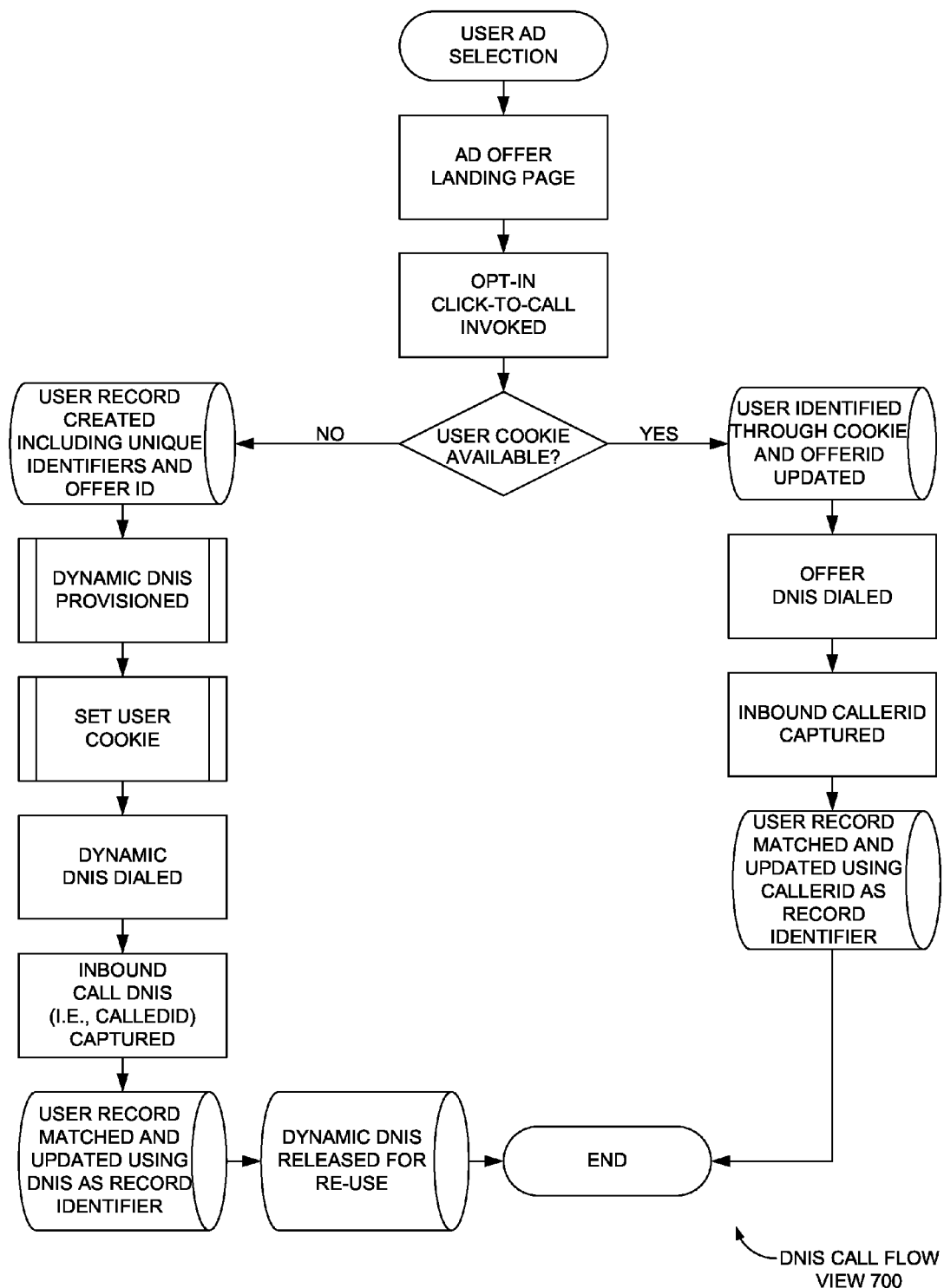
FIG. 7 is a flow chart of a DNIS Call Flow View 700, according to one or more exemplary embodiments.

FIG. 7 illustrates a DNIS Call Flow View 700, according to one or more embodiments. According to one exemplary embodiment utilizing the DNIS Call Flow system and/or method, a user (for example, User 106A or User 106N) selects an advertisement on his mobile device or any web interface. The user is shown to an ad offer landing page wherein an "opt-in click to call" method is invoked. If the user's cookie is available, the user is identified through the cookie and the user's offer is updated. Then, the offer DNIS is dialed (for example, Offer 200 communicates with Call Server 104 which in turn invokes DNIS Provisioning Server 102). Thereafter, the user's inbound CallerID is captured (for example, CalledID 202A or 202N). The user record in the DNIS Provisioning Server 102 is then updated using the CallerID as record identifier (for example, correlating User 106A to CalledID 202A and User 106N to CalledID 106N).

If the user cookie is not available, as illustrated in FIG. 7 and according to one embodiment, a user's record is created in the DNIS Provisioning Server 102 using the user's unique identifiers (for example, Unique ID 204 of FIG. 2, which may be the user's IP Address, Offer ID, User ID, Account ID or any other form of identification). Then, a dynamic DNIS is provisioned and a user cookie is set. The dynamic DNIS (which has been previously provisioned for the specific user, for example User 106A) may then be dialed and inbound call DNIS (i.e., Called ID) may be captured. The user record may be matched in DNIS Provisioning Server 102 and updated as well, using DNIS as a record identifier. The dynamic DNIS may then released for re-use, according to one or more exemplary embodiments.

According to one or more exemplary embodiments, the unique identifier 204 may be an IP address, an offer ID, a user ID and/or an account ID. The called ID 202 and a unique ID 204 may be associable with the user 106 within the DNIS provisioning server 102 such that the virtual currency 302 associable with the user 106 may be transmitted to the user's phone 108. The unique ID 204 may be correlated to a call's duration such that a $3^{rd}$ party API 402 associable with the user 106 may be correlated to the unique ID 204 and/or the called ID 202. The called ID 202 and the unique ID 204 associable with the user 106 may also be correlated within the DNIS provisioning server 102, according to one or more exemplary embodiments. In addition, a unique ID 204 associable with the call server 104 may be transmitted to a CTI server 500 such that a call center screen pop 506 may be created from a call center reference ID 504 in a CTI interface 502, according to one or more embodiments. The unique ID 204 may be tied to a primary key in a database such that data may be pulled back based on the unique identifier 204.

Figure 8:
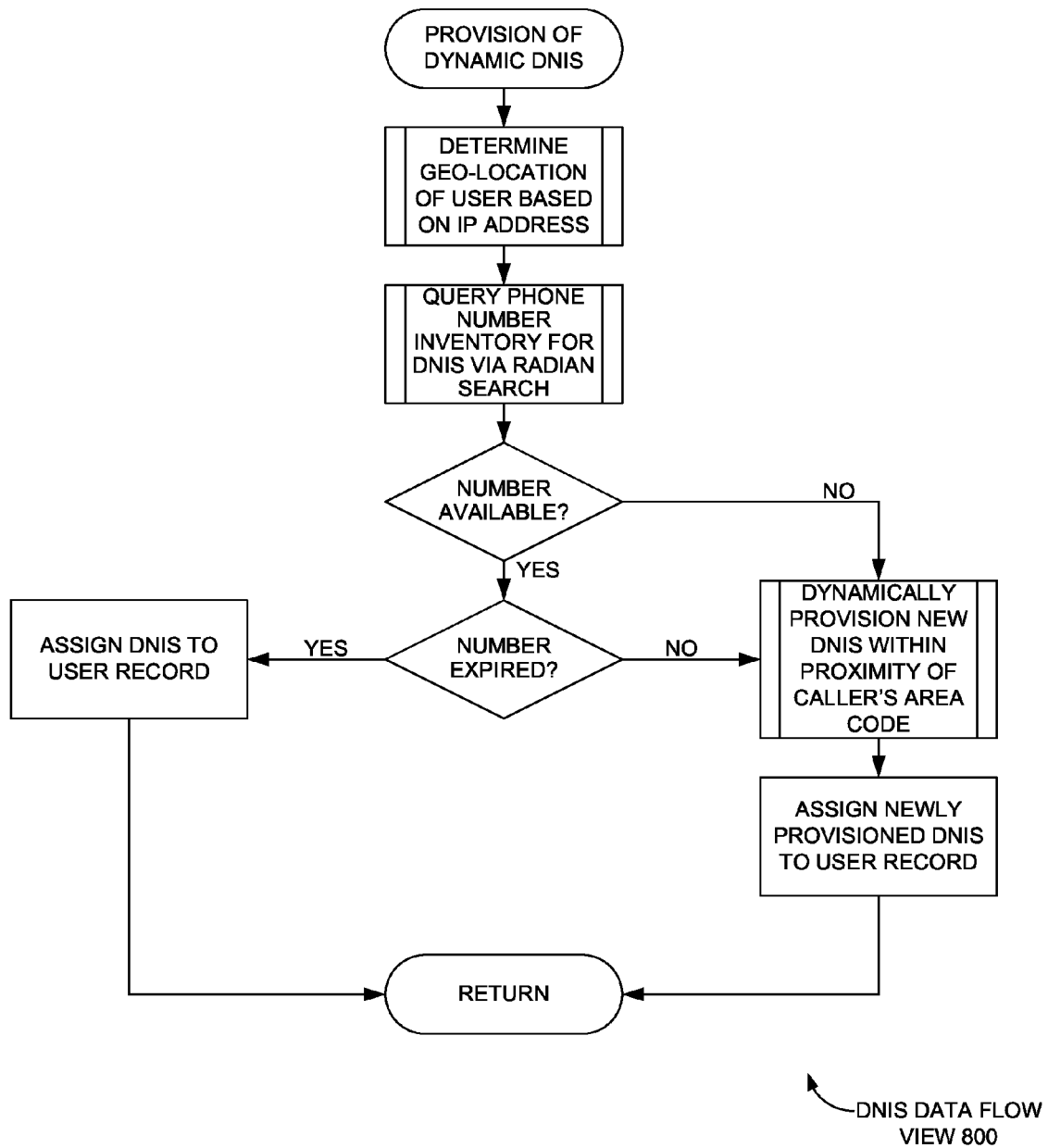
FIG. 8 is a flow chart of a DNIS Data Flow View 800, according to one or more exemplary embodiments.

FIG. 8 is a flow chart illustrating the DNIS Data Flow View 700, according to one or more exemplary embodiments. For example, once the dynamic DNIS has been provisioned, a geo-location may be determined based on the user's IP address (as schematically illustrated in FIG. 6B). The phone number inventory may then queried for a DNIS VIA RADIAN Search. If the number is available, the embodiment may check to see if the number is expired. If yes, if assigns the DNIS to the user record. If the number has not expired, then a new DNIS may be dynamically provisioned within proximity of a caller's area code (as shown in FIG. 6B). Subsequently, a newly provisioned DNIS is assigned to the user's record (for example, User 106A), according to one embodiment.

FIG. 9 illustrates a Dynamic DNIS View 900, according to one or more embodiments. This algorithm may have, according to one embodiment, input parameters that may be at least one of a plurality of an offer ID (for example, Offer ID 1102 of FIGS. 11A and 11B), a User IP (for example, User's IP Address 208) or any Unique ID 204, as illustrated in FIG. 2 and other identifiers as complex value pairs. Then, a web service call may be made across the Internet and the method may lead to a Get Offer DNIS ( ) which may relate back to the output parameter as a Dynamic DNIS (as the offer number), according to one or more embodiments.

Figure 10A:
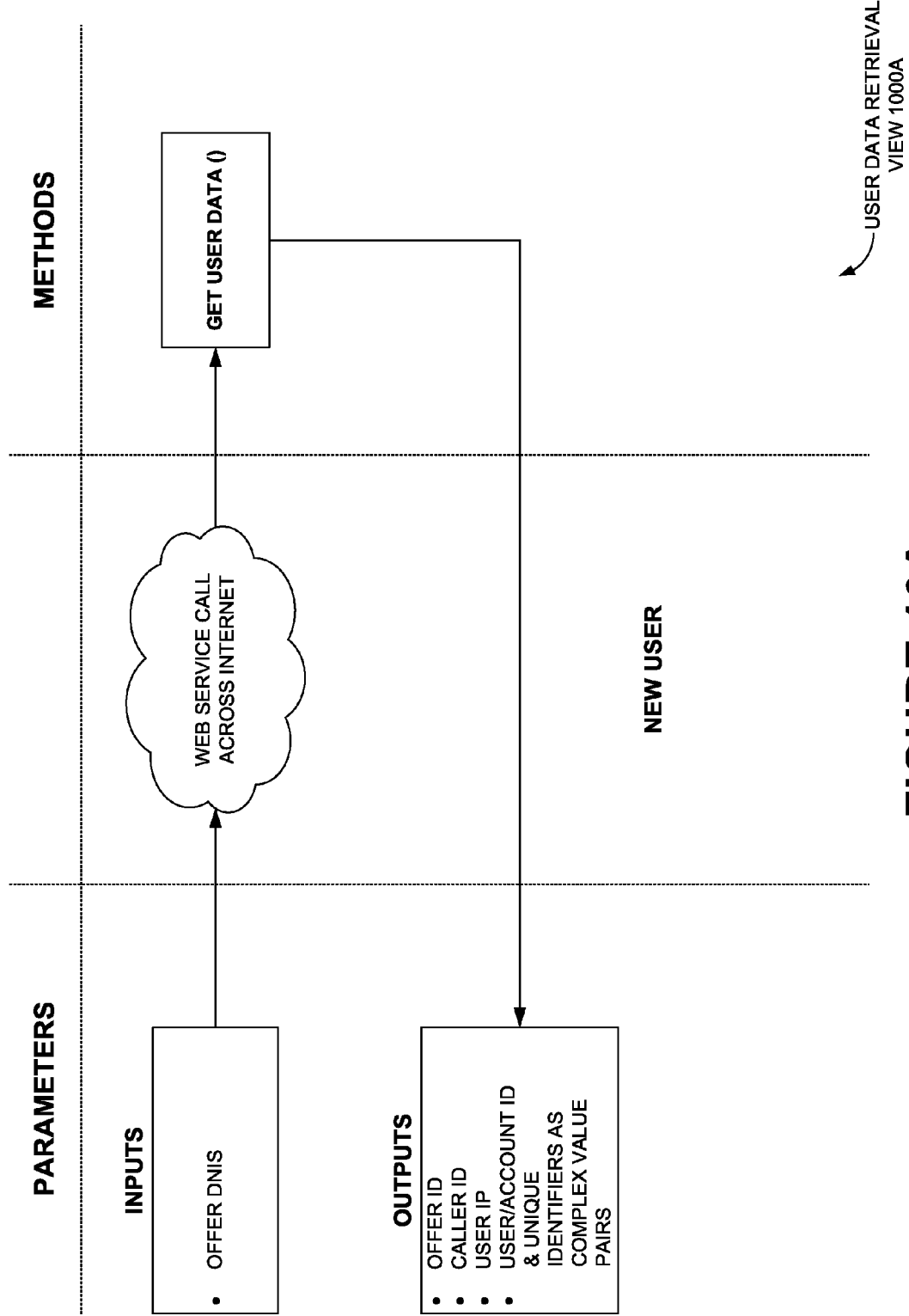
FIGS. 10A and 10B illustrate a User Data Retrieval View 1000A and 1000B, according to one or more exemplary embodiments.
Figure 10B:
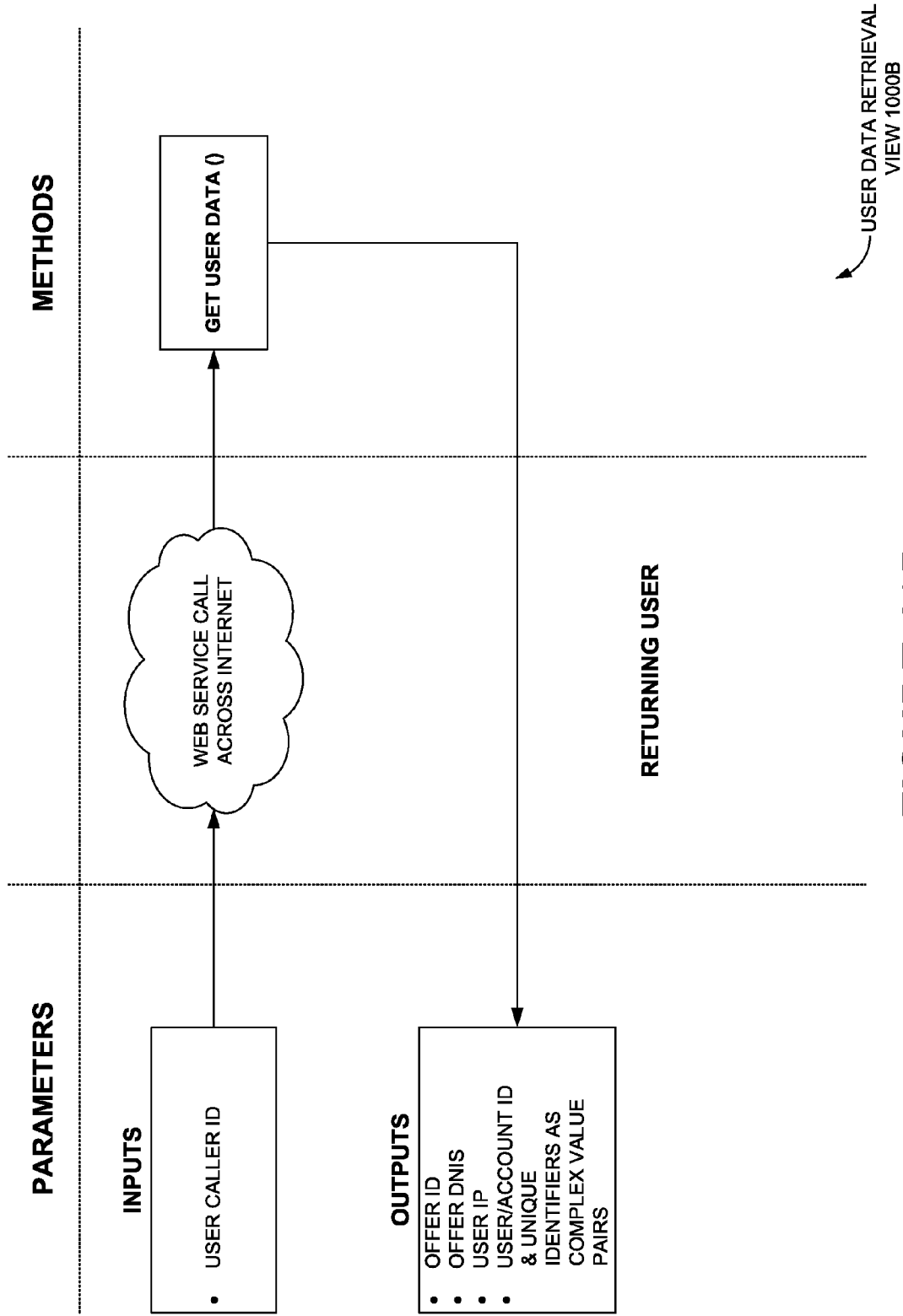

FIGS. 10A and 10B illustrate User Data Retrieval View 1000A, for a new user, and 1000B, for a returning user, according to one or more exemplary embodiments. According to one embodiment, for a new user, an input parameter of Offer DNIS (method being Get User Data 0), may lead to the output parameter being any Unique ID 204 related to the user (e.g., User 106A). FIG. 10B shows the same process as described above for a returning user. The input parameter for a returning user is a User Called ID (for example, Called ID 202), instead of Offer DNIS for a new user. The output parameter for a returning user instead may include the Offer DNIS, according to one or more exemplary embodiments.

FIGS. 11A and 11B illustrate a Table View 1100, according to one or more embodiments. Both tables show, according to one or more embodiments, the interaction and relationship between Offer ID 1102, Unique ID 204, Assigned DNIS 1104, User's IP Address 208, Other Unique Identifiers 1106, Caller ID 1114, DNIS Assigned Date 1108, DNIS expiration Date 1110 and Offer Completed 1112 as they may apply to different users (for example, User 106A, JSMITH3245, SRILLEY4353, TWRIGHT7657, User 106N, etc.). It will be appreciated that the above mentioned system and methods may interact with each other in any manner to produce the desired results of the present invention, according to one or more embodiments.

Figure 12:
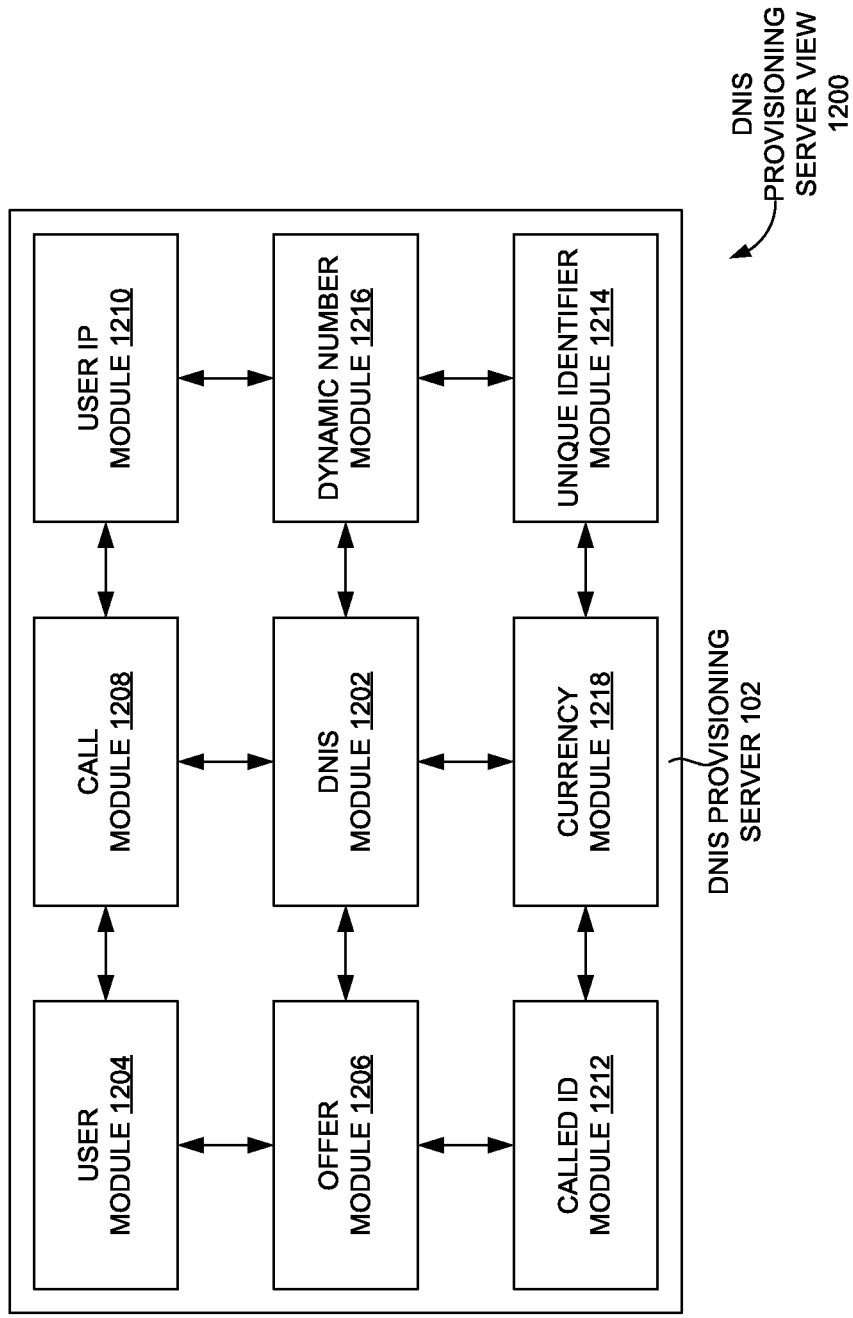
FIG. 12 shows a DNIS Provisioning Server View 1200, according to one or more exemplary embodiments.

FIG. 12 illustrates a DNIS Provisioning Server View 1200 that takes one inside the DNIS Provisioning Server 102, according to one or more embodiments. For example, it may be that the DNIS Module 1202 may communicate with the User Module 1204 via the Call Module 1208. For example, it may be that the Offer Module 1206 may communicate with the Called ID Module 1212. Finally, according to another example embodiment, it may be that the User IP Module 1210 may communicate with the Dynamic Number Module 1216, which in turn may communicate with the Unique Identifier Module 1214. In one example embodiment, the Unique Identifier Module 1214 may communicate with the Currency Module 1218. All modules described in this paragraph may communicate and interact with each other to perform individual or collaborative functions associated with this invention, according to one or more embodiments.

FIG. 13 illustrates an Offer Rank View 1300, according to one or more embodiments. The Offer Amount 1302, Offer Selection Rate 1304, Offer Score 1306 and Offer Rank 1308 are all compared between different offers, according to one exemplary embodiment.

According to another embodiment, the present invention may rely on other selection processes to help reduce the error rate. The system may attempt to freely rotate the dynamically issued phone numbers in the database by using a FIFO (first-in, first-out) approach but may also include some additional assignment logic. According to one exemplary embodiment, if the system may attempt to reissue an unclaimed or expired phone number to a new user, it may attempt not to assign one that may have an unclaimed record that may contain an IP location near the IP location of the newly assigned user. According to one embodiment, FIFO may be used to organize and manipulate a call data relative to time and prioritization. This expression may describes the principle of a queue processing technique or servicing conflicting demands by ordering process by first-come, first-served (FCFS) behavior: what comes in first is handled first, what comes in next waits until the first is finished, etc. Thus it may be analogous to the behavior of persons standing in line, where the persons leave the queue in the order they arrive, or waiting one's turn at a traffic control signal.

According to another embodiment, a Computer Telephony Integration (CTI) may be implemented to allow interactions between a telephone and a computer. This CTI implementation may provide the following services according to one or more distinct embodiments: call information display (caller's number (ANI), number dialed (DNIS), and screen population on answer, with or without using calling line data, automatic dialing and computer controlled dialing (fast dial, preview, and predictive dial), phone control (answer, hang up, hold, conference, etc.), coordinated phone and data transfers between two parties (i.e. pass on the Screen pop with the call), call center phone control. (logging on and after-call work notification), advanced functions such as call routing, reporting functions, automation of desktop activities, and multi-channel blending of phone, e-mail, and web requests agent state control (for example, after-call work for a set duration, then automatic change to the ready state), and call control for quality monitoring/call recording software.

It will be appreciated that, according to one or more embodiments, the data that is pulled back and/or received/retrieved from a call center API (e.g., $3^{rd}$ Party API 402) may also be used for ad server integration. According to another embodiment, it may also be used for upsell optimization. Additional user data gathered from the call center may be posted on the call center API upon call completion and may be used and/or implemented in ad delivery optimization (e.g., may include and/or exclude future ads based on trend user data gathered from a call center over a period of time), according to one or more exemplary embodiments. User data mentioned in this paragraph may include offer qualifying questions and/or offer opt-in history, according to one or more illustrative embodiments.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, all modules of FIG. 12 may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 14:
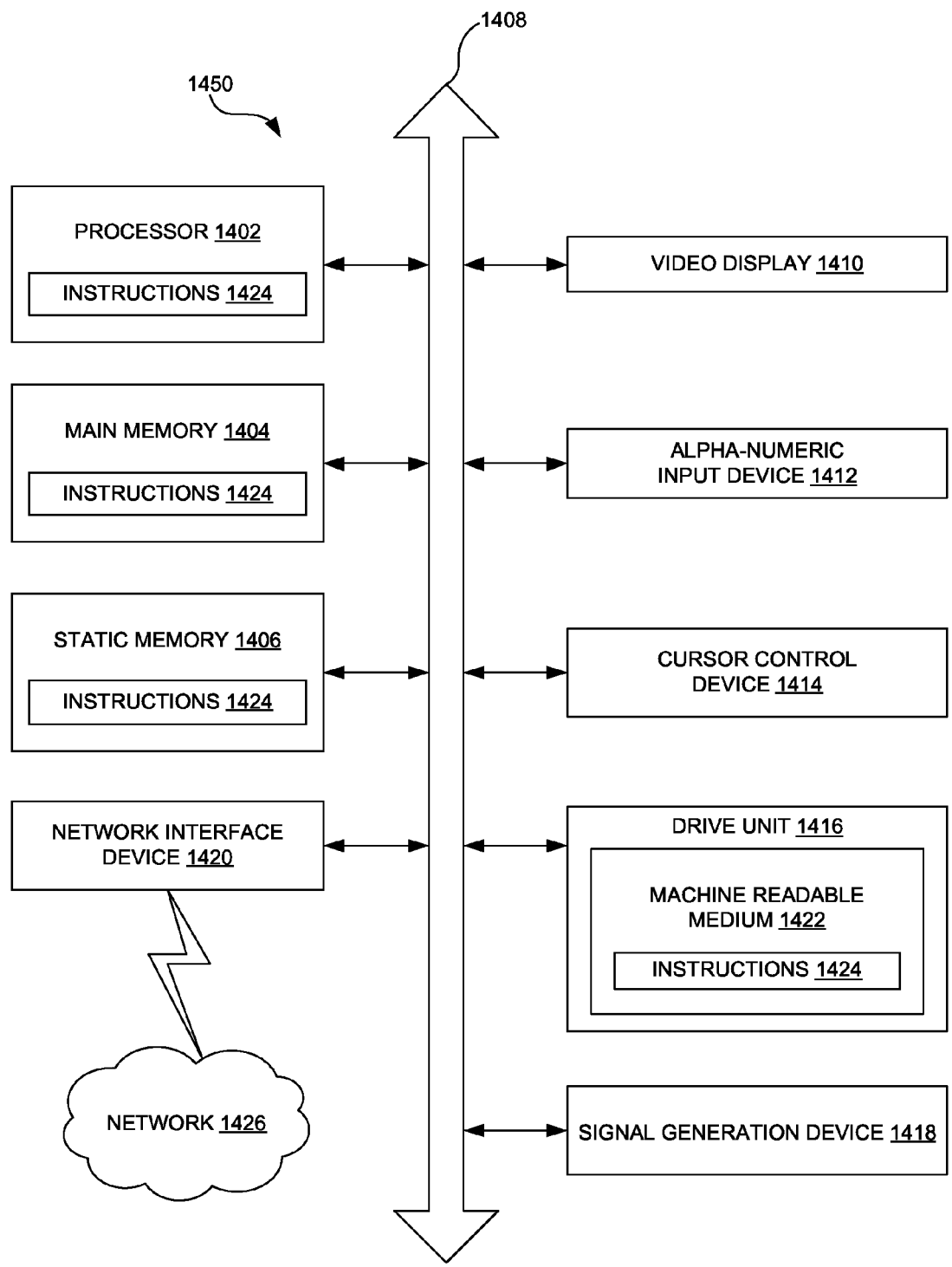
FIG. 14 illustrates a machine readable format view wherein any of the current and future embodiments of the present invention may be performed and carried out, according to one or more exemplary embodiments.

FIG. 14 may indicate a personal computer and/or the data processing system in which one or more operations disclosed herein may be performed. The processor 1402 may be a microprocessor, a state machine, an application specific integrated circuit, a field programmable gate array, etc. (e.g., Intel® Pentium® processor, 620 MHz ARM 1176, etc.). The main memory 1404 may be a dynamic random access memory and/or a primary memory of a computer system.

The static memory 1406 may be a hard drive, a flash drive, and/or other memory information associated with the data processing system. The bus 1408 may be an interconnection between various circuits and/or structures of the data processing system. The video display 1410 may provide graphical representation of information on the data processing system. The alpha-numeric input device 1412 may be a keypad, a keyboard, a virtual keypad of a touchscreen and/or any other input device of text.

The cursor control device 1414 may be a pointing device such as a mouse. The drive unit 1416 may be the hard drive, a storage system, and/or other longer term storage subsystem. The signal generation device 1418 may be a bios and/or a functional operating system of the data processing system. The network interface device 1420 may be a device that performs interface functions such as code conversion, protocol conversion and/or buffering required for communication to and from the network 1426. The machine readable medium 1428 may provide instructions on which any of the methods disclosed herein may be performed. The instructions 1424 may provide source code and/or data code to the processor 1402 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations).

The methods and systems disclosed herein may be implemented in any means for achieving various aspects, and may be executed in a form of a machine-readable medium embodying a set of instructions that, when executed by a machine, cause the machine to perform any of the operations disclosed herein. Accordingly, the specification and the drawings are regarded in an illustrative rather than a restrictive sense.

What is claimed is:

1. A method comprising:
    generating a markup page based on a unique identifier associated with a user of an online community;
    requesting a unique phone number to associate with the markup page based on the unique identifier associated with the user of the online community from a Dynamic Number Insertion Service (DNIS) server;
    generating a user record that contains the unique identifier and the unique phone number associated with the user;
    applying the unique phone number to the markup page;
    identifying the user of the online community when the user calls the unique phone number on the markup page;
    transferring to the user of the online community a virtual currency when the user calls the phone number on the mark up page using a processor and a memory based on the user record having the unique identifier and the unique phone number associated with the user;
    releasing the unique phone number back to the DNIS server for reuse when the markup page is no longer displayed;
    directing the user equipped with a user's phone to the markup page in a form of a landing page in response to a call request to a call server communicatively coupled with the DNIS server;
    creating the user record such that the user is identifiable through a plurality of unique identifiers;
    provisioning a dynamic DNIS using the DNIS server such that a called identifier (ID) associable with the landing page is generated;
    determining that the user has dialed the dynamic DNIS such that the called ID is captured; and
    matching the user record using the dynamic DNIS.

2. The method of claim 1 wherein the unique identifier is at least one of an IP address, an offer ID, a user ID and an account ID.

3. The method of claim 1 wherein at least one of the called ID and a unique ID is associable with the user within the DNIS provisioning server such that a virtual currency associable with the user is transmitted to the user's phone.

4. The method of claim 3 further comprising correlating the unique ID to a call duration such that a $3^{rd}$ party API associable with the user is correlated to at least one of the unique ID and the called ID.

5. The method of claim 4 further comprising correlating at least one of the called ID and the unique ID associable with the user within the DNIS provisioning server.

6. The method of claim 1 wherein a unique ID associable with the call server is transmitted to a CTI server such that a call center screen pop is created from a call center reference ID in a CTI interface.

7. The method of 1 wherein a unique ID is tied to a primary key in a database such that data is pulled back based on the unique identifier.

8. A system comprising:
    a user module to direct the user equipped with a user's phone to a landing page in response to a call request to a call server communicatively coupled with a DNIS provisioning server;
    an offer module to present the user with an offer visible on the landing page such that the offer is associable with a user's IP address;
    an unique identifier module for creating a user record such that the user is identifiable through a plurality of unique identifiers;
    a DNIS module for provisioning a dynamic DNIS using the DNIS provisioning server such that a called ID associable with the landing page is generated; and
    a currency module wherein at least one of a called ID and a unique ID is associable with the user within the DNIS provisioning server such that a virtual currency associable with the user is transmitted to the user's phone, wherein the system:
    to generate a markup page based on a unique identifier associated with a user of an online community,
    to request a unique phone number to associate with the markup page based on the unique identifier associated with the user of the online community from a Dynamic Number Insertion Service (DNIS) server,
    to generate a user record that contains the unique identifier and the unique phone number associated with the user,
    to apply the unique phone number to the markup page,
    to identify the user of the online community when the user calls the unique phone number on the markup page,
    to transfer to the user of the online community a virtual currency when the user calls the phone number on the mark up page using a processor and a memory based on the user record having the unique identifier and the unique phone number associated with the user, and to release the unique phone number back to the DNIS server for reuse when the markup page is no longer displayed.

9. The system of claim 8 wherein the unique identifier is at least one of an IP address, an offer ID, a user ID and an account ID.

10. The system of claim 8 wherein at least one of a called ID and a unique ID is associable with the user within the DNIS provisioning server such that the virtual currency associable with the user is transmitted to the user's phone.

11. The system of claim 10 further comprising correlating the unique ID to a call duration such that a $3^{rd}$ party API associable with the user is correlated to at least one of the unique ID and the called ID.

12. The system of claim 11 further comprising correlating at least one of the called ID and the unique ID associable with the user within the DNIS provisioning server.

13. The system of claim 8 wherein a unique ID associable with the call server is transmitted to a CTI server such that a call center screen pop is created from a call center reference ID in a CTI interface.

14. The system of 8 wherein a unique ID is tied to a primary key in a database such that data is pulled back based on the unique identifier.

15. A method comprising:
generating a markup page based on a unique identifier associated with a user of an online community;
requesting a unique phone number to associate with the markup page based on the unique identifier associated with the user of the online community from a Dynamic Number Insertion Service (DNIS) server;
generating a user record that contains the unique identifier and the unique phone number associated with the user;
applying the unique phone number to the markup page;
identifying the user of the online community when the user calls the unique phone number on the markup page;
transferring to the user of the online community a virtual currency when the user calls the phone number on the mark up page using a processor and a memory based on the user record having the unique identifier and the unique phone number associated with the user;
releasing the unique phone number back to the DNIS server for reuse when the markup page is no longer displayed.

16. The method of claim 15 further comprising:
directing the user equipped with a user's phone to the markup page in a form of a landing page in response to a call request to a call server communicatively coupled with the DNIS server;
creating the user record such that the user is identifiable through a plurality of unique identifiers;
provisioning a dynamic DNIS using the DNIS server such that a called identifier (ID) associable with the landing page is generated;
determining that the user has dialed the dynamic DNIS such that the called ID is captured; and
matching the user record using the dynamic DNIS,
wherein the unique identifier is at least one of an IP address, an offer ID, a user ID and an account ID.

17. The method of claim 16 wherein at least one of the called ID and a unique ID is associable with the user within the DNIS provisioning server such that a virtual currency associable with the user is transmitted to the user's phone.

18. The method of claim 17 further comprising correlating the unique ID to a call duration such that a $3^{rd}$ party API associable with the user is correlated to at least one of the unique ID and the called ID.

19. The method of claim 18 further comprising correlating at least one of the called ID and the unique ID associable with the user within the DNIS provisioning server.

20. The method of claim 19 wherein a unique ID associable with the call server is transmitted to a CTI server such that a call center screen pop is created from a call center reference ID in a CTI interface.

\* \* \* \* \*